United States Patent
Schlosser (10) Patent No.: US 11,056,761 B2
(45) Date of Patent: Jul. 6, 2021

(54) SHAFT ANTENNA SYSTEM FOR MOBILE COMMUNICATION

(71) Applicant: Telefonaktiebolaget LM Ericsson (publ), Stockholm (SE)

(72) Inventor: Maximilian Schlosser, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 713 days.

(21) Appl. No.: 15/735,037

(22) PCT Filed: Jun. 9, 2016

(86) PCT No.: PCT/EP2016/063095
§ 371 (c)(1),
(2) Date: Dec. 8, 2017

(87) PCT Pub. No.: WO2016/198491
PCT Pub. Date: Dec. 15, 2016

(65) Prior Publication Data
US 2020/0036077 A1    Jan. 30, 2020

(30) Foreign Application Priority Data

Jun. 11, 2015    (DE) .................. 102015007505.5

(51) Int. Cl.
*H01Q 1/12* (2006.01)
*H01Q 1/42* (2006.01)
(Continued)

(52) U.S. Cl.
CPC ......... *H01Q 1/1207* (2013.01); *G01F 15/063* (2013.01); *H01Q 1/04* (2013.01); *H01Q 1/2233* (2013.01); *H01Q 1/246* (2013.01)

(58) Field of Classification Search
CPC .......... H01Q 1/04; H01Q 1/12; H01Q 1/1207; H01Q 1/22; H01Q 1/2233; H01Q 1/24; H01Q 1/246; H01Q 1/42
See application file for complete search history.

(56) References Cited

U.S. PATENT DOCUMENTS 5,298,894 A * 3/1994 Cerny .................... G08C 17/02
340/870.02
5,583,492 A * 12/1996 Nakanishi ............. G08C 17/02
340/870.02
(Continued)

FOREIGN PATENT DOCUMENTS

| DE | 20 2006 009 922 | 8/2006 |
|---|---|---|
| EP | 1 801 293 | 6/2007 |
| GB | 2 326 002 | 12/1998 |

OTHER PUBLICATIONS

International Search Report of PCT/EP2016/063095, dated Aug. 24, 2016, 3 pages.

*Primary Examiner* — Tho G Phan
(74) *Attorney, Agent, or Firm* — Sage Patent Group (57) ABSTRACT

A shaft antenna system for mobile communication has an antenna housing and a supporting frame. The frame has a frame top side, a frame bottom side and an insertion opening located at the height of the frame top side. An accommodating space adjoins the insertion opening in which the antenna housing is arranged. The antenna housing has at least one supporting device for retaining the antenna housing within the supporting frame. A closing cover closes the insertion opening and the accommodating space. The closing cover is supported at the edge region of the closing cover at least indirectly on the supporting frame and covers a top side of the antenna housing by the inner face of the closing cover. The closing cover has a central region, the surface of which facing downward is at least 60% of the total inner (Continued)

surface of the closing cover facing downward, wherein the central region is arranged above the adjacent top side of the antenna housing without contact.

16 Claims, 5 Drawing Sheets

(51) Int. Cl.
    *G01F 15/06*     (2006.01)
    *H01Q 1/04*     (2006.01)
    *H01Q 1/22*     (2006.01)
    *H01Q 1/24*     (2006.01)

(56) References Cited

U.S. PATENT DOCUMENTS

| | | | |
|---|---|---|---|
| 5,825,303 A * | 10/1998 | Bloss, Jr. | H01Q 1/2233 340/870.02 |
| 6,177,883 B1 * | 1/2001 | Jennetti | G08C 17/02 340/870.02 |
| 6,369,769 B1 * | 4/2002 | Nap | G01F 15/063 343/719 |
| 6,414,605 B1 * | 7/2002 | Walden | G01D 4/008 340/870.02 |
| 7,429,933 B2 * | 9/2008 | Brennan | G08C 17/02 340/870.07 |
| 8,011,628 B1 | 9/2011 | Suddeth | |
| 9,912,047 B2 * | 3/2018 | Eberly | H01Q 1/42 |
| 10,243,264 B2 * | 3/2019 | Foore | H01Q 5/392 |
| 2005/0152700 A1 | 7/2005 | Fling et al. | |
| 2006/0226325 A1 | 10/2006 | Cook et al. | |
| 2012/0112981 A1 | 5/2012 | Crowther et al. | |

\* cited by examiner

SHAFT ANTENNA SYSTEM FOR MOBILE COMMUNICATION

CROSS-REFERENCE TO RELATED APPLICATIONS

This application is the U.S. national phase of International Application No. PCT/EP2016/063095 filed Jun. 9, 2016; which claims priority to German Patent Application No. 10 2015 007 505.5 filed Jun. 11, 2015. The disclosures of these applications are incorporated herein in their entirety by reference.

STATEMENT REGARDING FEDERALLY SPONSORED RESEARCH OR DEVELOPMENT

None.

FIELD

This invention describes a shaft antenna system for mobile communication. Shaft antennas are often used where normal antennas cannot be used because this spoils the look of the landscape. This relates in particular to city centres, where regulations prohibit the use of mobile communications antennas that are visible from a distance. Shaft antennas are preferably built into the ground or carriageways, and achieve a considerable propagation range due to multiple reflection from the surrounding buildings.

BACKGROUND AND SUMMARY

An antenna system in a shaft is known from US 2005/0 152 700 A1. An antenna that can be introduced through a single opening is positioned in this shaft. The single opening is closed by a cover. The antenna is connected to a receiver, which is in turn connected to a glass fibre. A battery supplies the receiver and the antenna with power.

GB 2 326 002 A also discloses a shaft antenna of this type. The shaft antenna is inserted into a hole in the ground and is supplied with power and data by an underground supply line. Here, the antenna system is integrated in a housing, the surface of the housing being flush with the surface of the carriageway.

Another shaft antenna is known from EP 1 801 293 A2. The shaft antenna does not have its own housing, but instead it is arranged on the underside of an existing manhole cover.

A drawback of the shaft antennas from the prior art is that vibrations are transmitted to the antenna system by loading on the manhole cover and/or on the antenna housing, as is caused by pedestrians or vehicles. Mechanical coupling of this type results in a significant reduction in the service life of the antenna.

The problem addressed by the invention is therefore that of providing a shaft antenna system which is arranged as close to ground level as possible and at the same time is decoupled from vibrations originating from vehicles or pedestrians.

The problem is solved in relation to a shaft antenna system in accordance with the features specified in claim 1 and in relation to an antenna housing in accordance with the features specified in claim 19. Advantageous developments of the invention are set out in the dependent claims.

The shaft antenna system according to the invention is used for mobile communication, in particular for transmitting telephony and/or data packets. Said system comprises an antenna housing, into which at least one antenna, in particular a broadband antenna, is or can be introduced. Furthermore, the shaft antenna system comprises a support frame, which has an upper frame side and a lower frame side. In the vertical extension of the upper frame side, there is an insertion opening, adjacent to which there is a receiving space in which the antenna housing is arranged. The receiving space may for example be a cavity in the carriageway or in a pedestrian area, and therefore is a cavity in the support frame. The antenna housing comprises at least one support apparatus, by means of which it is held inside the support frame. Furthermore, the shaft antenna system comprises a cover plate that closes the insertion opening and the receiving space, is supported at least indirectly on the support frame in the edge region thereof, and covers an upper side of the antenna housing with its inner side. This cover plate is the component within the shaft antenna system which is directly loaded by vehicles or pedestrians. The cover plate also comprises a central region, the downwardly pointing surface thereof accounting for at least 60% of the entire downwardly pointing inner surface of the cover plate, the central region being arranged without contact above the adjacent upper side of the antenna housing relative thereto.

It is particularly advantageous here for the shaft antenna system to comprise, in addition to an antenna housing, a cover plate that is separate from the antenna housing. The antenna housing and the cover plate are mechanically decoupled from one another. This means that a force acting on the cover plate, for example due to a vehicle or a pedestrian, does not act on the antenna housing, but is conducted into the support frame over the edge region of the cover plate. The wording whereby the cover plate is supported "at least indirectly" on the support frame should be understood to mean that the edge region of the cover plate rests on the support frame and/or on the part of the support apparatus, which in turn is supported on the support frame. This therefore prevents mechanical coupling between the cover plate and the antenna housing. Vibrations that act on the cover plate are therefore not passed to the antenna housing. The service life of the electrical components formed within the antenna housing is therefore significantly increased.

The support apparatus may be n projections or a peripheral flange, the projections or the peripheral flange resting on a first support, which is part of the support frame and extends towards the receiving space. The use of projections also prevents the antenna housing from rotating within the support frame. A flange could comprise ripples on its underside as rotation protection, which engage in depressions within the first support. Rotation protection would equally be provided the other way round.

In order to make it easier to insert the antenna housing into the support frame, the first support tapers conically, at least in portions, from the upper frame side towards the lower frame side. Additionally or alternatively, it is also possible for the first support to be in parallel with an end face of the support frame at least in part, i.e. in parallel with the surface of the carriageway.

If the support apparatus is designed for example as a flange, the cover plate can rest on the underside of the edge region thereof, solely on the part of the at least one support apparatus that in turn rests on the first support. Forces that are introduced into the cover plate by a vehicle are conducted vertically downwards (i.e. perpendicularly to the surface of the carriageway) from said plate, over its edge region, into the support frame. The fact that these forces are also conducted into the support frame at least over the part of the support apparatus is harmless, because the edge region of the cover plate rests in an interlocking and force-locked manner on the part of the support apparatus that in turn rests in an interlocking and force-locked manner on the first support.

Alternatively, it is also possible for the cover plate to rest on the underside of the edge region thereof solely on a second support or both on the second support and on the part of the support apparatus that in turn rests on the first support. Here, in addition to the first support, the support frame also comprises a second support, which also extends towards the receiving space, like the first support. Here, a support surface of the second support is arranged closer to the upper frame side than a support surface of the first support. The first support also extends further towards the receiving space than the second support, or the second support comprises at least one recess, by means of which the first support is formed. It is advantageous here that the underside of the edge region of the cover plate rests solely on the second support and does not contact the support apparatus of the antenna housing, or is arranged in a contactless manner relative thereto. This results in improved mechanical decoupling, and fewer oscillations and vibrations caused by pedestrians and vehicles are transmitted to the antenna housing.

The first and the second supports are for example support shoulders or support lugs. The two supports may be arranged in parallel with one another in this case. As with the first support, it is also applicable to the second support that it tapers conically, at least in portions, from the upper frame side towards the lower frame side, and/or that it is in parallel with the end face of the portion frame. Conical tapering of this type can make it easier to install the cover plate.

The upwardly pointing outer side of the cover plate is flush with an end face of the support frame or flush with the surface of the carriageway. This prevents a pedestrian's step from being broken, or prevents the rolling noise of a vehicle from significantly increasing for a brief time.

The support apparatus and the antenna housing are preferably formed integrally. A multi-part design, i.e. for example by screwing the support apparatus to the antenna housing, would also be possible. It is also possible to bond the support apparatus to the antenna housing, because the antenna housing itself is not loaded by pedestrians or vehicles.

In longitudinal section, at least in the central region the underside of the cover plate has an indentation, which may have a concave shape, for example, such that the central region is always arranged without contact above the adjacent upper side of the antenna housing. The concave shape and/or the indentation is selected such that the midpoint of the central region is always spaced apart from the upper side of the antenna housing, even in the event of a high load, for example caused by a lorry. If the underside of the cover plate has a concave shape in longitudinal section when unloaded, when it is subjected to a very high load, said underside may have a shape that extends approximately in parallel with the end face of the support frame or in parallel with the upper side of the antenna housing.

The support frame additionally comprises peripheral sides that diverge from the upper frame side towards the lower frame side at least in part. This means that the external diameter of the support frame widens in the downward direction, such that it cannot be pulled out of an opening in the carriageway once it has been properly inserted therein. This is prevented by earth and/or tar.

In order to protect the antenna electronics against environmental influences, a sealing element may additionally be formed between the support frame and the support cover. This is also possible between the support frame and the antenna housing. Preferably, the antenna housing is watertight, or an opening in the antenna housing points downwards, i.e. away from the underside of the cover plate.

Generally, terms such as "upwards", "upper" and "top", and "downwards", "lower" and "bottom" should be understood to mean that the upper side of the carriageway is at the top and the end of the receiving space is at the bottom, and therefore said space is the furthest from the upper side of the carriageway. The shaft antenna system is also penetrated by a central axis, the midpoint of the central axis preferably extending through the middle of the central region of the cover plate. The carriageway, or the end face of the support frame, extends perpendicularly to this imaginary central axis.

BRIEF DESCRIPTION OF THE DRAWINGS

Various embodiments of the invention are described in the following by way of example with reference to the drawings. Like items have like reference numerals. Specifically, in the corresponding figures of the drawings.

DETAILED DESCRIPTION OF NON-LIMITING EMBODIMENTS

Figure 1:
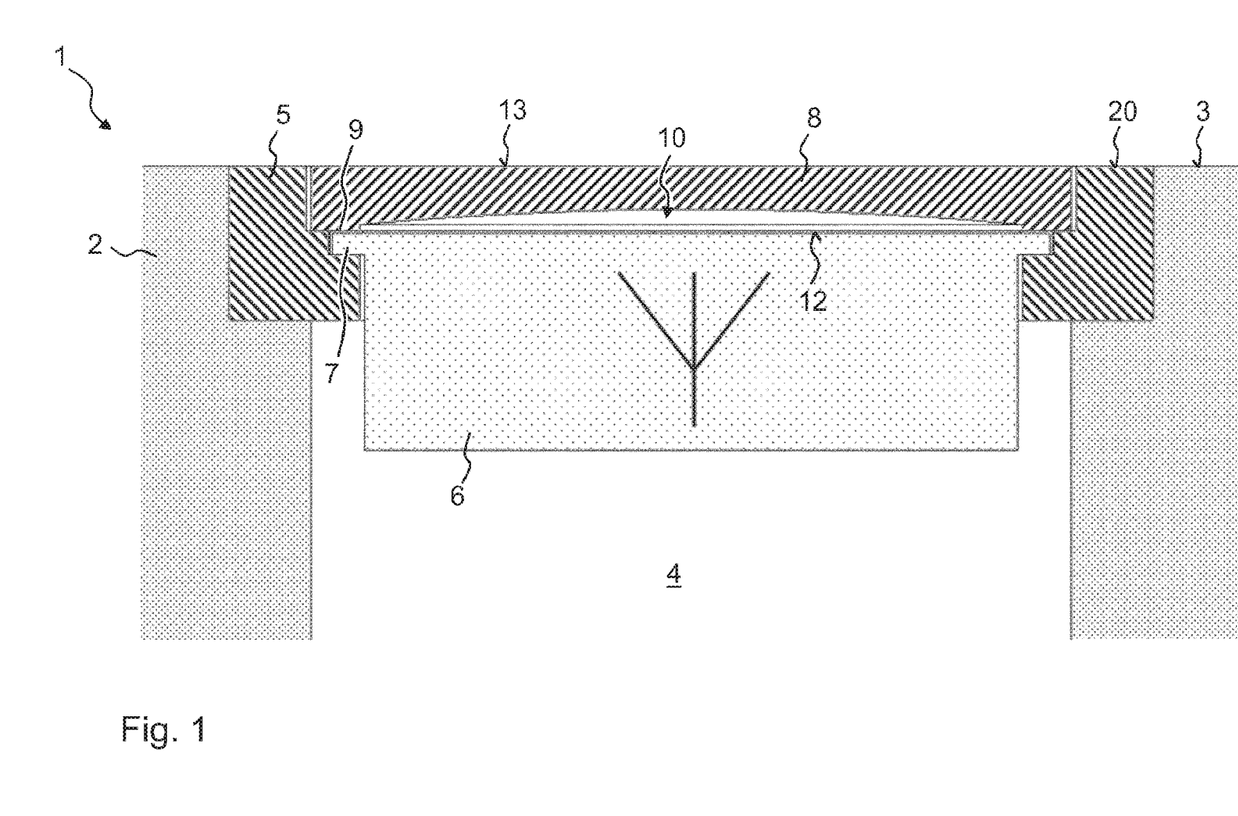
FIG. 1 is a longitudinal section through the shaft antenna system according to the invention, comprising an antenna housing, a support frame and a cover plate.

FIG. 1 is a longitudinal section through the shaft antenna system 1 according to the invention, comprising a support frame 5, an antenna housing 6, and a cover plate 8. The support frame 5 is introduced into a hole or a recess 4 in the ground 2. A surface of the ground 2 may for example be the carriageway 3. At least one antenna is introduced into the antenna housing 6. The at least one antenna may be resiliently mounted within the antenna housing 6. The at least one antenna is in particular a broadband antenna, which can be used both for transmitting voice and video services and for transmitting broadband services.

The antenna housing 6 and thus the antenna itself are intended to be arranged as close to the surface as possible, i.e. as close to the carriageway 3 as possible, so that a high range can be achieved.

For this purpose, the antenna housing 6 comprises at least one support apparatus 7, by means of which the antenna housing 6 can be retained in the support frame 5 so as to be suspended or mounted.

The receiving space 4 is formed within the support frame 5 and below the support frame 5. The antenna housing 6 is arranged within the receiving space 4. The antenna housing 6 may project downwards further than the support frame 5, for example.

Here, the cover plate 8 closes this receiving space 4 and at the same time covers the antenna housing 6.

The cover plate 8 comprises a downwardly pointing edge region 9, by means of which the cover plate 8 is supported on the support frame 5 at least indirectly.

The cover plate 8 also comprises a central region 10, the downwardly pointing surface thereof accounting for at least 60% of the entire downwardly pointing inner surface of the cover plate 8, the central region 10 being arranged without contact above the adjacent upper side 12 of the antenna housing 6 relative thereto.

The cover plate 8 being loaded by a pedestrian or a motor vehicle results in the force introduced into the cover plate 8 being conducted into the support frame 5 over the edge region 9 of said cover plate.

The upwardly pointing outer side 13 of the cover plate 8 is flush with an end face 20 of the support frame 5. The end face 20 of the support frame 5 is in turn flush with the surface of the carriageway 3. It would also be possible for the cover plate 8 to additionally cover the end face 20 of the support frame 5 and to be flush with the surface of the carriageway 3.

The support apparatus 7 is formed in the upper third of the vertical extension of the antenna housing 6. This means that the centre of gravity of the antenna housing 6 is below the support apparatus 7. In the embodiment from FIG. 1, the centre of gravity of the antenna housing 6 is also below support frame 5.

The support apparatus 7 could also be formed in the middle third of the vertical extension of the antenna housing 6, preferably in the middle of the vertical extension thereof.

Alternatively, the support apparatus 7 could also be formed in the lower third of the vertical extension of the antenna housing 6.

In longitudinal section, at least in the central region 10 the underside of the cover plate 8 has an indentation or a concave shape, such that the central region 10 is arranged without contact above the adjacent upper side 12 of the antenna housing 6. When the cover plate 8 is loaded, the shape of the indentation, or the concave shape when unloaded, can change.

When subjected to maximum loading, the concave shape of the central region 10 shown in FIG. 1 may extend in parallel with, but with spacing from, the upper side 12 of the antenna housing 6.

The surface area of the downwardly pointing central region 10 is at least 70%, preferably at least 80%, more preferably at least 90%, yet more preferably at least 95%, of the entire downwardly pointing inner surface of the cover plate 8. Here, the downwardly pointing inner surface of the cover plate 8 is preferably composed solely of the edge region 9 and the central region 10.

Figure 2:
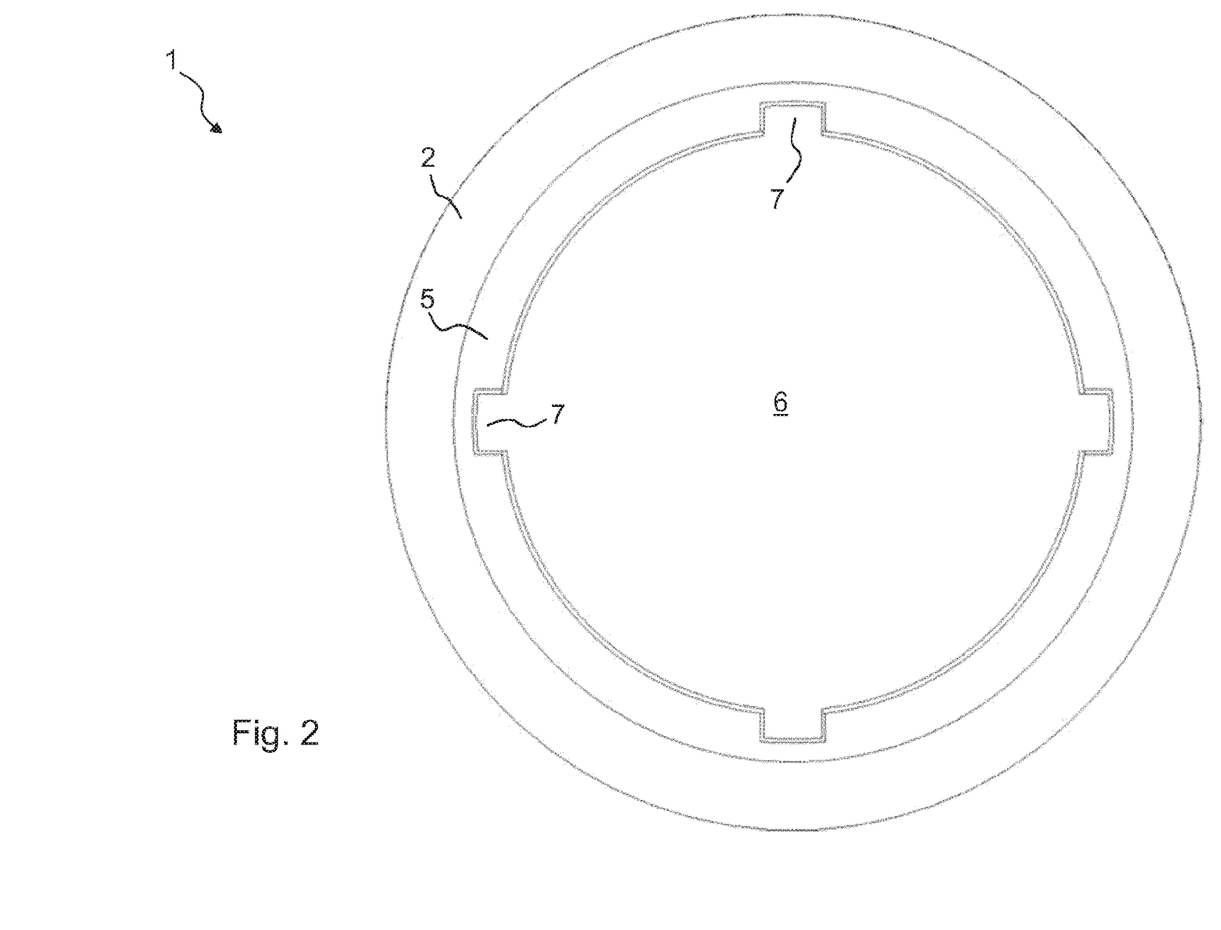
FIG. 2 is a plan view of the shaft antenna system according to the invention, with the cover plate removed.

FIG. 2 is a plan view of the shaft antenna system 1 according to the invention, with the cover plate 8 removed. The support frame 5 is integrated in the ground 2. The antenna housing 6 is suspended in the support frame 5. The antenna housing 6 is inserted into the support frame 5 from the direction of the insertion opening 23, as shown in FIG. 3A.

In this embodiment, the support frame 5 and the insertion opening 23 have the cross-sectional shape of a circle in plan view. Other cross-sectional shapes, such as that of a square, a rectangle, an oval or a regular or irregular m-polygon are also conceivable. In this embodiment, the support apparatus 7 and the antenna housing 6 are formed integrally. A multi-part design is also possible. In this embodiment, the at least one support apparatus 7 is formed by n projections, where n=4. The n projections are the same distance from one another. If the insertion opening has a round cross section, the n projections are at a distance of 360°/n from one another. If four projections are used, they are at a distance of 90° from one another.

Figure 3A:
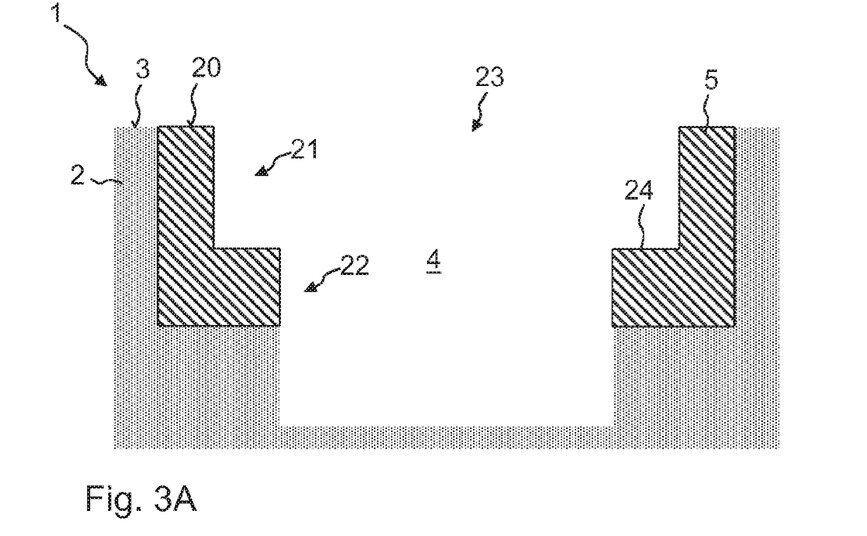
FIG. 3A is a longitudinal section through the shaft antenna system according to the invention, in which just the support frame is inserted into a prepared shaft.

FIG. 3A is a longitudinal section through the shaft antenna system 1 according to the invention, in which just the support frame 5 is inserted into a prepared shaft. This prepared shaft is also a receiving space 4 at the same time. Cables which feed the antenna within the antenna housing 6 are preferably guided to the receiving space 4 underground. The same also applies to the power supply.

The support frame 5 comprises an upper frame side 21 and a lower frame side 22. The upper frame side 21 is closer to the carriageway 3 than the lower frame side 22. The antenna housing 6 can be laid or inserted into the support frame 5 through an insertion opening 23, which is formed on the upper frame side 21.

The support frame 5 also comprises a first support 24, which is preferably a support shoulder or support lug. In the embodiment from FIG. 3A, the first support 24 is arranged in parallel with the carriageway 3 and with the end face 20 of the support frame 5.

Figure 3B:
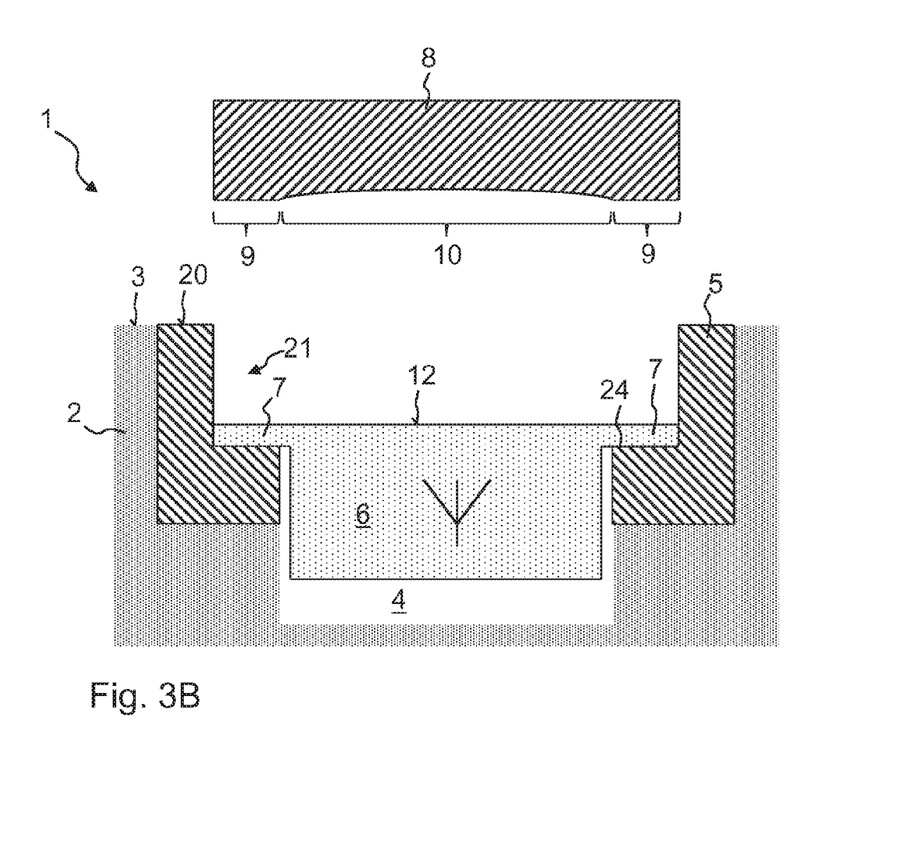
FIG. 3B is a longitudinal section through the shaft antenna system according to the invention, in which the antenna housing is suspended in the support frame.

FIG. 3B is a longitudinal section through the shaft antenna system 1 according to the invention, in which the antenna housing 6 is suspended in the support frame 5. The support apparatus 7, which is formed by projections in the embodiment from FIG. 3B, rests on the first support 24. The antenna housing 6 is therefore supported on the support frame 5. The antenna housing 6 is spaced apart from the ground 2 in the recess 4. Here, the antenna housing 6 is spaced apart both from the ground 2 at its lateral peripheral surface and from the ground 2 at its underside.

The antenna housing 6 may also comprise a signal processing unit. In addition to the baseband processing, this also includes amplifiers and attenuators. In this case, it would be sufficient for only a data link and a power supply to be added into the antenna housing 6.

The data link may be a fibreglass line and the power supply may simply be a power cable. Battery operation would also be possible, just as it would also be possible to use the shaft antenna system 1 as a repeater. The battery could also be charged by means of solar cells which are located in the surroundings.

In addition, it would also be possible for attenuating elements to be formed between the support apparatus 7 and the first support 24. Attenuating elements of this type ensure that vibrations that are introduced into the ground by people or motor vehicles through the cover plate 8 or the carriageway 3 are transmitted only in an attenuated manner, or advantageously not at all, to the antenna housing 6.

An edge region 9 of the cover plate 8 is understood to be the region on the underside of the cover plate 8 in which the cover plate 8 rests at least indirectly on the support frame 5.

Figure 4A:
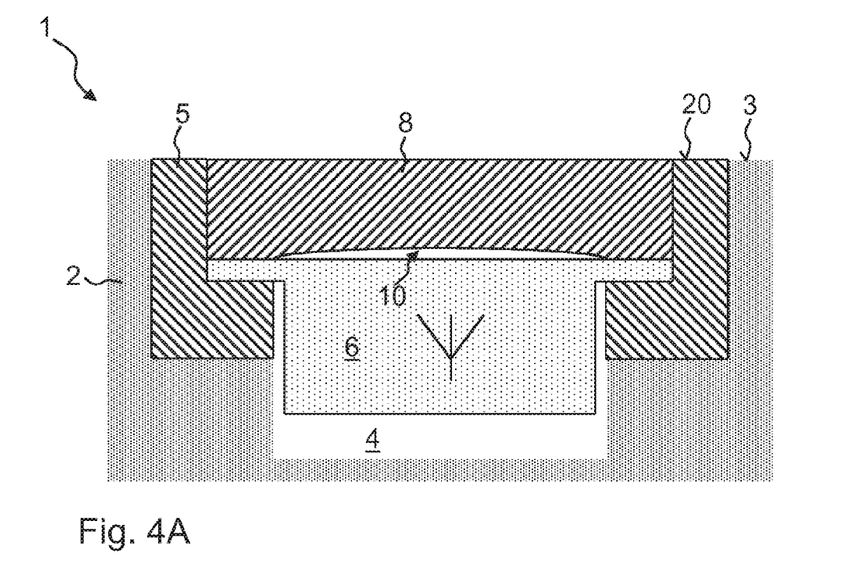
FIG. 4A is a longitudinal section through the shaft antenna system according to the invention, in which the edge region of the cover plate rests on the part of the support apparatus of the antenna housing that in turn rests on the support frame.

FIG. 4A is a longitudinal section through the shaft antenna system 1 according to the invention, in which the edge region 9 of the cover plate 8 rests on the part of the support apparatus 7 of the antenna housing 6 that in turn rests on the support frame 5. FIG. 4A shows that the cover plate 8 is supported indirectly on the support frame 5 in the edge region 9 thereof. It is important that the edge region 9 is only in contact with the parts of the support apparatus 7 that in turn rest tightly on the first support 24.

Figure 4B:
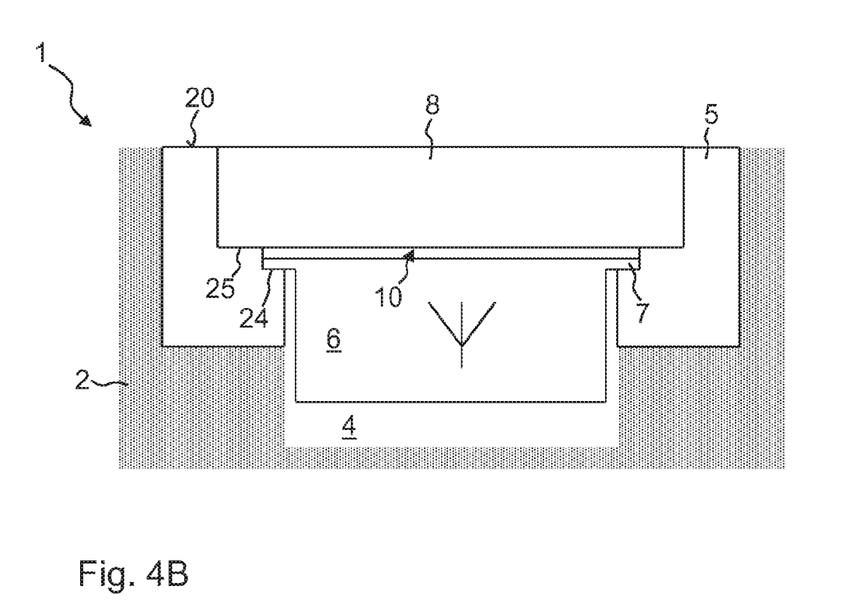
FIG. 4B is a longitudinal section through the shaft antenna system according to the invention, in which the edge region of the cover plate rests solely on the support frame and the support apparatus of the antenna housing also rests solely on the support frame.

FIG. 4B is a longitudinal section through the shaft antenna system 1 according to the invention, in which the edge region 9 of the cover plate 8 rests solely on the support frame 5 and the support apparatus 7 of the antenna housing 6 likewise rests solely on the support frame 5. For reasons of clarity, the shading of the support frame 5, the antenna housing 6 and the cover plate 8 has been omitted.

The cover plate 8 rests solely on a second support 25, on the underside of the edge region 9 thereof. By contrast, the support apparatus 7 rests on the first support 24. It would also be possible for the underside of the edge region 9 of the cover plate 8 to rest both on the second support 25 and on the part of the support apparatus 7 that in turn rests on the first support 24.

The second support 25 is also a support shoulder or support lug. In addition to the first support 24, the support frame 5 also comprises the second support 25, which also extends towards the receiving space 4. A support surface of the second support 25 is arranged closer to the upper frame side 21 than a support surface of the first support 24. In this embodiment, the first support 24 extends further towards the receiving space 4 than the second support 25. The support surface of the first support 24 is in parallel with the support surface of the second support 25. The two support surfaces extend in parallel with the end face 20 of the support frame 5, or in parallel with the carriageway 3, or in parallel with an upper side 12 of the antenna housing 6.

Using the first and second supports 24, 25, which are separate from one another, results in excellent mechanical decoupling of the cover plate 8 from the antenna housing 6. Vibrations that are introduced into the cover plate 8 are conducted into the support frame 5 by means of the second support 25, and do not reach the antenna housing 6, or are very heavily attenuated if they do reach it.

The cover plate 8 consists of a non-conductive material, in particular of a plastics material. The same applies to the antenna housing 6, which also consists of plastics material.

Additional metal reflectors may also be arranged within the antenna housing 6 so that the signal emitted by the antennas arranged within the antenna housing 6 is not emitted into the ground 2, but from the receiving space 4 towards the insertion opening 23 and therefore to the outside. The support frame 5, which can also be referred to as the support ring, is preferably made of a non-conductive material, i.e. of a dielectric.

The cover plate 8 preferably has a diameter of more than 20 cm, preferably of more than 30 cm, more preferably of more than 40 cm, but most preferably of less than 50 cm. The cover plate 8 is intended to withstand a load of up to 40 tonnes.

The cover plate 8 is separate from the support frame 5 and the antenna housing 6. The cover plate 8 is mechanically decoupled from the antenna housing 6.

In this case, the shaft antenna system 1 is installed in the ground. It would also be possible to mount said system on walls.

Figure 5A:
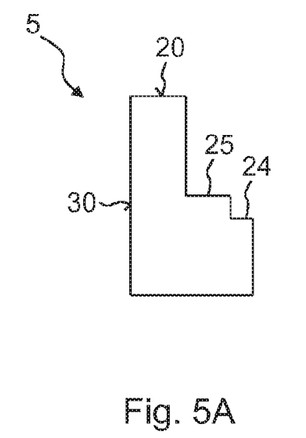
FIG. 5A-5E show various longitudinal sections through the support frame.

FIG. 5A to 5E show various longitudinal sections through a part of the support frame 5. In FIG. 5A, the support frame 5 comprises a first support 24 and a second support 25 that is spaced apart from the first support 24 and is arranged closer to the end face 20. A peripheral face 30 of the support frame 5 is arranged in parallel with a central axis that penetrates the shaft antenna system 1. The peripheral face 30 is perpendicular to the end face 20 in this figure.

Figure 5B:
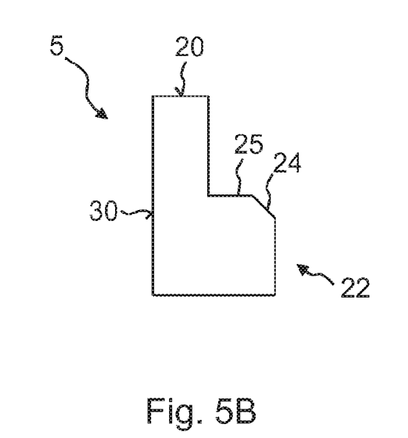

In FIG. 5B, the first support 24 tapers conically from the upper frame side 21 towards the lower frame side 22 over the entire extent thereof. In the embodiment from FIG. 5B, it would also be possible for the first support 24 to taper conically from the upper frame side 21 towards the lower frame side 22 at least in portions.

Figure 5C:
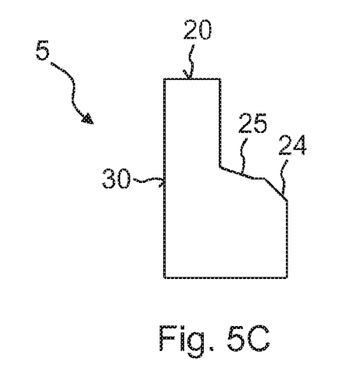

In FIG. 5C, a first support 24 and a second support 25 are formed. In addition to the first support 24, the second support 25 also tapers conically from the upper frame side 21 towards the lower frame side 22. In this case, said support tapers conically in portions.

Figure 5D:
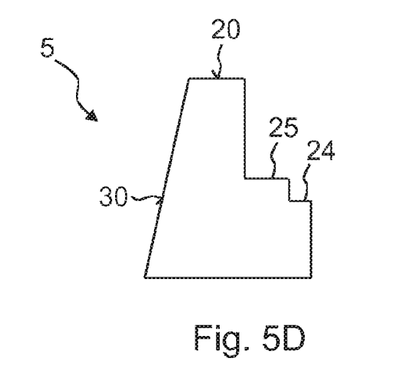

In FIG. 5D, there is also a first support 24 and a second support 25, which extend in parallel with the end face 20 of the support frame 5. By contrast, the peripheral face 30 extends obliquely. This means that the support frame 5 widens from the carriageway 3, i.e. from the upper frame side 21 towards the lower frame side 22. The peripheral faces 30 diverge from the upper frame side 21 towards the lower frame side 22.

Figure 5E:
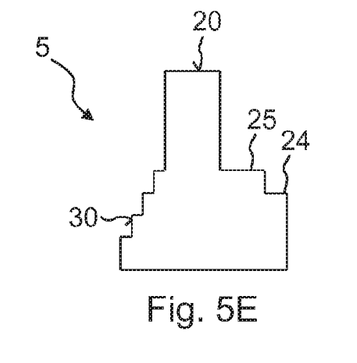

It would also be possible for said faces to diverge in portions, as shown in FIG. 5E. The extension in FIG. 5D in continuous in this case, and is preferably conical.

In FIG. 5E, the peripheral faces 30 extend in a tapered manner, with the support frame 5 being wider on its lower frame side 22 than on its upper frame side 21. When being inserted into the ground 2, earth is placed around the support frame 5, meaning that it can no longer be pulled out of the ground 2.

Figure 6:
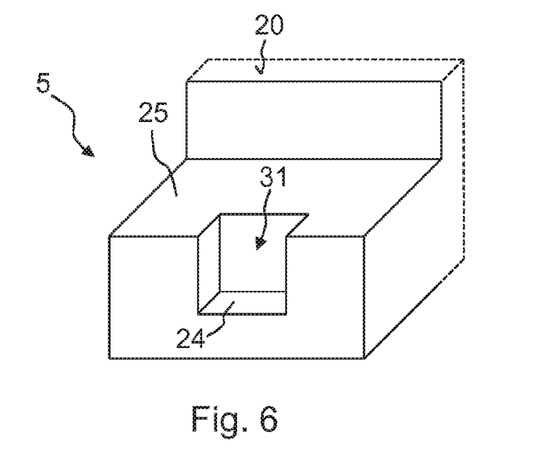
FIG. 6 is a simplified three-dimensional view of the support frame.

FIG. 6 is a simplified three-dimensional view of part of the support frame 5. Said figure shows the second support 25 and the first support 24. In this embodiment, the second support 25 comprises at least one recess 31, by means of which the first support 24 is formed. The support apparatus 7, in the form of a projection, can engage in this recess 31. As a result, the antenna housing 6 is arranged in the support frame 5 such that it cannot rotate.

Here, the support apparatus is not as tall as the recess 31, such that the edge region 9 of the cover plate 8 rests solely on the second support 25 and not on the support apparatus 7. Here, the edge region 9 of the cover plate 8 can contactlessly cover the part of the support apparatus 7 that is arranged in the recess 31.

However, it would also be possible for the support apparatus 7 to be flush with the surface of the second support 25. Furthermore, it would also be possible for the support apparatus 7 to project upwards, i.e. towards the upper frame side 21, via the recess 31. In this case, the edge region 9 of the cover plate 8 would have to have a corresponding cut-out.

Attenuating elements that make it difficult to transmit vibrations within the support frame 5 towards the antenna housing 6 are additionally arranged within the recess 31.

The basic principle is that the antenna housing 6 can be screwed and/or bonded to the support frame 5 by means of the support apparatus 7. This is optional, however.

By contrast, the cover plate 8 is screwed to the support frame 5. A screw connection of this type may for example be produced through the edge region 9 towards the second support 25.

Screws that are not electrically conductive are preferably used in all screw connections. The first support 24 extends further towards the receiving space 4, i.e. towards the central axis, than the second support 25.

The support frame 5 is formed integrally with its first and second supports 24, 25.

If there is a small gap between the upper frame side 21 and a lateral surface of the cover plate 8, a drainage opening may extend through the first and/or second support 24, 25 that conducts away any permeating rainwater towards the receiving space 4 or towards a sewer. The invention is not limited to the embodiments described. Within the scope of the invention, all the features described and/or illustrated can be combined with one another as desired.

Lastly, it is also noted that the antenna assembly explained can be arranged and installed, in particular underground, both in roads and on paths or in parks. However, it is also possible to install the antenna assembly in tunnels, on bridges or in buildings. In this case, the invention primarily provides significant advantages in places where it is necessary to decouple vibrations and to reduce or prevent compressive loads on the antenna housing. This applies both to road vibrations and to vibrations in buildings.

The invention claimed is:

1. A shaft antenna system for mobile communication comprising:
    a support frame comprising an upper frame side and a lower frame side, and an insertion opening located in a vertical extension of the upper frame side and to which a receiving space is adjacent,
    a cover plate, which closes the insertion opening and the receiving space in the support frame, the cover plate being supported at least indirectly on the support frame in an edge region thereof,
    at least one antenna,
    an antenna housing is provided, into which the at least one antenna is introduced,
    the cover plate comprising a central region having a downwardly pointing surface thereof accounting for at least 60% of an entire downwardly pointing inner surface of the cover plate, the central region being arranged without contact above an upper side of the antenna housing,
    the antenna housing is arranged in the receiving space and an inner side of the cover plate covers the upper side of the antenna housing,
    the antenna housing comprises at least one support apparatus, by means of which the antenna housing is retained within the support frame; and
    in longitudinal section, at least in the central region, an underside of the cover plate has an indentation or a concave shape, such that the central region is arranged without contact above the upper side of the antenna housing.

2. The shaft antenna system according to claim 1, wherein:
    the downwardly pointing surface of the central region is at least 70%, of the entire downwardly pointing inner surface of the cover plate.

3. The shaft antenna system according to claim 1, wherein:
    the at least one support apparatus is formed by n projections, where n>2, or is a peripheral flange;
    the n projections or the peripheral flange rest on a first support;
    the first support is part of the support frame and extends towards the receiving space.

4. The shaft antenna system according to claim 3, wherein:
    the first support:
    a) tapers conically, at least in portions, from the upper frame side towards the lower frame side; and/or
    b) is in parallel with an end face of the support frame at least in part.

5. The shaft antenna system according to claim 3, wherein:
    the n projections are a same distance from one another.

6. The shaft antenna system according to claim 3, wherein:
    the cover plate rests on the underside of the edge region thereof, solely on the part of the at least one support apparatus that in turn rests on the first support.

7. The shaft antenna system according to claim 3, wherein:
    the cover plate rests on an underside of the edge region thereof:
    a) solely on a second support; or
    b) both on a second support and on the part of the support apparatus that in turn rests on the first support.

8. The shaft antenna system according to claim 7, wherein:
    in addition to the first support, the support frame comprises a second support which extends towards the receiving space;
    a support surface of the second support is arranged closer to the upper frame side than a support surface of the first support;
    the first support extends further towards the receiving space than the second support, or the second support comprises at least one recess, by means of which the first support is formed.

9. The shaft antenna system according to claim 7, wherein:
    a support surface of the first support is in parallel with a support surface of the second support; and/or
    the second support:
    a) tapers conically, at least in portions, from the upper frame side towards the lower frame side; and/or
    b) is in parallel with an end face of the support frame at least in part.

10. The shaft antenna system according to claim 3, wherein:
    the first support and/or a second support are support shoulders or support lugs.

11. The shaft antenna system according to claim 1, wherein:
    an upwardly pointing outer side of the cover plate is flush with an end face of the support frame.

12. The shaft antenna system according to claim 1, wherein:
    the antenna housing is retained in the support frame so as to be suspended or mounted.

13. The shaft antenna system according to claim 1, wherein:
    the support apparatus is formed in an upper third of a vertical extension of the antenna housing; or
    the support apparatus is formed in a middle third of the vertical extension of the antenna housing, preferably in the middle of the vertical extension thereof; or
    the support apparatus is formed in a lower third of the vertical extension of the antenna housing.

14. The shaft antenna system according to claim 1, wherein a cross-sectional shape of the support frame and/or the insertion opening corresponds to or approximates, in plan view,
    a square; or a rectangle; or
an oval; or
a circle; or
a regular or irregular n-polygon.

15. The shaft antenna system according to claim 1, wherein:
the support frame comprises peripheral sides that diverge from the upper frame side towards the lower frame side at least in portions.

16. The shaft antenna system according to claim 1, wherein:
at least one sealing element is formed between the support frame and the cover plate;
and/or at least one sealing element is formed between the support frame and the antenna housing;
and/or the antenna housing is watertight.

* * * * *